(12) United States Patent
Nakatani

(10) Patent No.: US 7,765,870 B2
(45) Date of Patent: Aug. 3, 2010

(54) ACCELERATION SENSOR AND METHOD OF MANUFACTURING THE SAME

(75) Inventor: Goro Nakatani, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 384 days.

(21) Appl. No.: 11/892,289

(22) Filed: Aug. 21, 2007

(65) Prior Publication Data

US 2008/0041157 A1    Feb. 21, 2008

(30) Foreign Application Priority Data

Aug. 21, 2006  (JP) .............................. 2006-224433

(51) Int. Cl.
*G01P 15/12* (2006.01)

(52) U.S. Cl. .................................. 73/514.33; 29/621.1

(58) Field of Classification Search ............. 73/514.33; 338/2, 5, 43; 29/621.1
See application file for complete search history.

(56) References Cited

U.S. PATENT DOCUMENTS

| 5,520,051 A * | 5/1996 | Fujii et al. ............... 73/514.36 |
| 7,398,684 B2 * | 7/2008 | Kimino .................... 73/514.38 |
| 2005/0151448 A1 * | 7/2005 | Hikida et al. ............... 310/338 |

FOREIGN PATENT DOCUMENTS

JP    2005-351716    12/2005

* cited by examiner

*Primary Examiner*—John E Chapman
(74) *Attorney, Agent, or Firm*—Rabin & Berdo, P.C.

(57) ABSTRACT

An acceleration sensor includes a semiconductor element built in a substrate, a wiring layer formed on the substrate, and a piezoresistor, formed on the substrate and made up of a part of the wiring layer, whose resistivity changes by the action of acceleration.

3 Claims, 4 Drawing Sheets

1

2

ACCELERATION SENSOR AND METHOD OF MANUFACTURING THE SAME

BACKGROUND OF THE INVENTION

1. Field of the Invention

The present invention relates to an acceleration sensor and a method of manufacturing the same.

2. Description of Related Art

Loading of a sensor (MEMS sensor) employing the MEMS (Micro Electro Mechanical Systems) technique on a portable telephone has recently been started, which has drawn increasing attention to the MEMS sensor. An acceleration sensor for detecting the acceleration of an object is known as a typical MEMS sensor.

FIG. 4 is a sectional view schematically showing the structure of a conventional acceleration sensor.

This acceleration sensor 101 shown in FIG. 4 includes a circuit chip 104 having a circuit for calculating and correcting acceleration, a sensor chip 105 having a piezoresistor (not shown) and a weight 106 of tungsten in a cavity formed by a ceramic package 102 and a shielding plate 103.

The ceramic package 102 has a six-layer structure obtained by laminating six ceramic substrates 102A to 102F, for example. The lower three ceramic substrates 102A, 102B and 102C have rectangular shapes of the same size in plan view. The upper three ceramic substrates 102D, 102E and 102F have the same outline as the ceramic substrates 102A, 102B and 102C in plan view. A rectangular opening is formed on the central portion of each of the ceramic substrates 102D, 102E and 102F. The opening of the ceramic substrate 102D laminated on the ceramic substrate 102C is smaller than that of the ceramic substrate 102E laminated on this ceramic substrate 102D. The opening of the ceramic substrate 102E is smaller than that of the ceramic substrate 102F laminated on this ceramic substrate 102E.

A plurality of pads 107 are arranged on the upper surface of the ceramic substrate 102D. Each of the pads 107 is electrically connected to the circuit chip 104 and the sensor chip 105 through respective bonding wires 108. Wires 109 extending from the pads 107 are formed on the upper surface of the ceramic substrate 102D. The respective wires 109 are connected to an electrode 111 arranged on the lower surface of the lowermost ceramic substrate 102A through via holes 110 vertically penetrate the lower three ceramic substrates 102A, 102B and 102C.

The shielding plate 103 is bonded to the upper surface of the uppermost ceramic substrate 102F so as to close the opening of this ceramic substrate 102F.

The circuit chip 104 is formed of a silicon chip. The circuit chip 105 is bonded to the upper surface of the ceramic substrate 102C through silver paste, with the front surface of a device-forming region thereof facing upward.

The sensor chip 105 is formed by etching a silicon chip from the side of the rear surface (opposite to the front surface on the side of the device forming region) thereof. This sensor chip 105 integrally includes a membrane 112, a frame-shaped support section 113 provided on the peripheral edge portion of the lower surface of the membrane 112, and a weight holding section 114 provided on the central portion of the lower surface of the membrane 112 in the form of a quadrangular prismoid narrowing downward. The membrane 112 is formed by a thin layer portion including the front surface of the silicon chip on the side of the device-forming region. The piezoresistor is built in the membrane 112.

The sensor chip 105 is supported above the circuit chip 104 by chip spacers 115 interposed between the respective corner portions of the support section 113 and the front surface of the circuit chip 104, at a prescribed interval from the front surface of the circuit chip 104.

The weight 106 is fixed to the lower surface of the weight holding section 114 with an adhesive, and arranged between the circuit chip 104 and the sensor chip 105 in a state of not being in contact with the circuit chip 104 and the chip spacers 115.

When acceleration acts on this acceleration sensor 101 and the weight 106 oscillates, the membrane 112 is deformed, and stress acts on the piezoresistor provided on the membrane 112. The resistivity of the piezoresistor changes in proportion to the stress acting thereon. Therefore, the acceleration acting on the acceleration sensor 101 can be determined on the basis of the change in the resistivity of the piezoresistor.

However, the circuit chip 104, the sensor chip 105 and the weight 106 are provided independently of one another, whereby the conventional acceleration sensor is hard to be downsized.

SUMMARY OF THE INVENTION

An object of the present invention is to provide a downsizeable acceleration sensor and a method of manufacturing the same.

One aspect of the present invention may provide an acceleration sensor including: a semiconductor element built in a substrate; a wiring layer formed on the substrate; and a piezoresistor, formed on the substrate and made up of a part of the wiring layer, whose resistivity changes by the action of acceleration.

According to this structure, the piezoresistor made up of a part of the wiring layer is provided on the substrate having the semiconductor element built therein. If a circuit generating a signal corresponding to the amount of a change in the resistivity of the piezoresistor is formed by the semiconductor element built in the substrate, acceleration acting on the acceleration sensor can be determined on the basis of the signal output from the circuit when the acceleration acts on the acceleration sensor.

The piezoresistor is formed on the substrate, so that the semiconductor element and the piezoresistor are integrated on a single chip. When this chip is employed, therefore, a circuit chip provided in a conventional acceleration sensor can be omitted, and the acceleration sensor can be downsized.

The acceleration sensor preferably further includes a wire protective film formed on the wiring layer for protecting the wiring layer; and a weight made up of a part of the wire protective film located on the piezoresistor for applying stress to the piezoresistor by the action of acceleration.

According to this structure, the weight for applying stress to the piezoresistor is made up of the part of the wire protective film for protecting the wiring layer. Thus, no weight may be provided independently of the chip having the semiconductor element and the piezoresistor integrated thereon, whereby the acceleration sensor can be further downsized.

The acceleration sensor preferably further includes an interlayer film adjacently formed under the wiring layer, the piezoresistor and the weight are preferably arranged in a cavity formed by etching the wire protective film and the interlayer film, and the piezoresistor is preferably extended between side surfaces of the cavity.

According to this structure, the piezoresistor and the weight are arranged in the cavity formed by etching the wire protective film and the interlayer film. The piezoresistor is extended between the side surfaces of the cavity, and the weight is held on this piezoresistor. Therefore, the weight reliably oscillates and the resistivity of the piezoresistor changes even if acceleration acting on the acceleration sensor is small. Therefore, small acceleration can be excellently detected.

The acceleration sensor including the interlayer film can be manufactured by a method of manufacturing an acceleration sensor including: an interlayer film forming step of forming the interlayer film on a substrate having a semiconductor element built therein; a wiring layer forming step of forming a wiring layer on the interlayer film; a wire protective film-forming step of forming a wire protective film on the wiring layer for protecting the wiring layer; and an etching step of etching the wire protective film and the interlayer film to thereby form a piezoresistor made up of a part of the wiring layer and a weight made up of a part of the wire protective film located on the piezoresistor.

The acceleration sensor preferably further includes a film layer formed on the wire protective film for closing the cavity.

According to this structure, the acceleration sensor is provided with the film layer closing the cavity. The amount of oscillation of the weight in the laminating direction of the wire protective film and the interlayer film can be restricted with this film layer. Therefore, the weight can be prevented from excessive oscillation, and the piezoresistor can be prevented from breaking or the like from excessive oscillation of the weight.

The piezoresistor may be in the form of a cross or a lattice, or may extend linearly.

In the linearly extending structure, the piezoresistor preferably includes a first piezoresistor extending in a direction X parallel to a front surface of the substrate; and a second piezoresistor extending in a direction Y parallel to the front surface of the substrate and perpendicular to the direction X. If the weight is provided on the first and second piezoresistors in this case, the resistivity of the second piezoresistor changes when acceleration in the direction X acts on the acceleration sensor, while the resistivity of the first piezoresistor changes when acceleration in the direction Y acts on the acceleration sensor. Therefore, the acceleration in the directions X and Y acting on the acceleration sensor can be excellently detected.

The foregoing and other objects, features, and advantages of the present invention will become more apparent from the following detailed description of embodiments when taken in conjunction with the accompanying drawings.

DETAILED DESCRIPTION OF PREFERRED EMBODIMENTS

Figure 1:
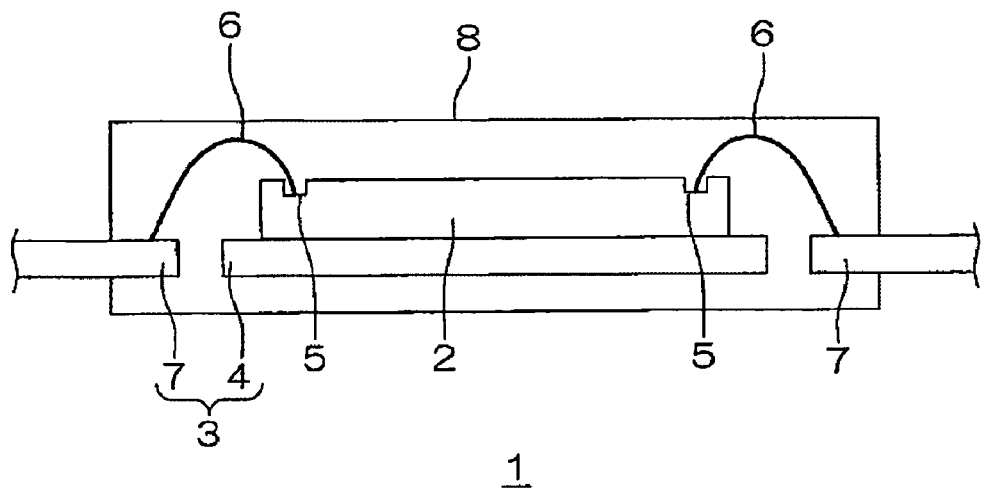
FIG. 1 is a sectional view schematically showing the structure of an acceleration sensor according to an embodiment of the present invention.

FIG. 1 is a sectional view schematically showing the structure of an acceleration sensor according to an embodiment of the present invention.

This acceleration sensor 1 is a piezoresistance type acceleration sensor. The acceleration sensor 1 includes a sensor chip 2 having a semiconductor element and a piezoresistor, described later, integrally formed thereon.

The sensor chip 2 is die-bonded to an island portion 4 of a lead frame 3. A plurality of pads 5 are provided on the front surface of the sensor chip 2. These pads 5 are electrically connected (wire-bonded) to lead portions 7 of the lead frame 3 through bonding wires 6.

The sensor chip 2 is sealed with a resin package 8, along with the lead frame 3 and the bonding wires 6. Parts of the lead portions 7 of the lead frame 3 are exposed from the resin package 8, to function as external connecting portions (outer lead portions) with a printed wiring board or the like.

Figure 2:
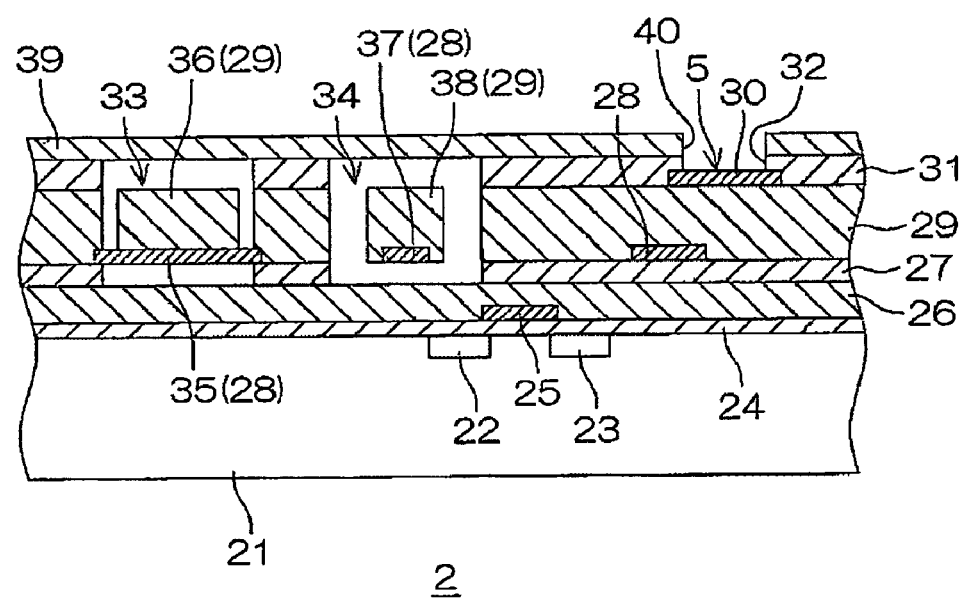
FIG. 2 is a sectional view schematically showing the structure of a sensor chip provided on the acceleration sensor.
Figure 2:
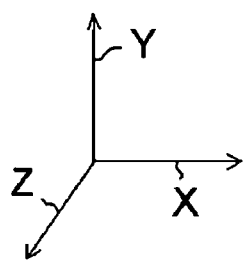

FIG. 2 is a sectional view schematically showing the structure of the sensor chip 2 in relation to the axes of an X,Y,Z coordinate system.

The sensor chip 2 includes a semiconductor substrate 21. A semiconductor element such as a MOS transistor including a drain region 22 and a source region 23, for example, is built in the surface layer portion of this semiconductor substrate 21.

A gate oxide film 24 is formed on the semiconductor substrate 21. A gate electrode 25 of polysilicon is formed on this gate oxide film 24, and is opposed to a channel region located between the drain region 22 and the source region 23.

A first interlayer film 26 of $SiO_2$ (silicon dioxide) is laminated on the gate oxide film 24 and the gate electrode 25. A second interlayer film 27 of SiN (silicon nitride) is laminated on the first interlayer film 26. A first wiring layer 28 is pattern-formed on the second interlayer film 27. The first wiring layer 28 has a five-layer structure obtained by laminating a Ti (titanium) layer, a TiN (titanium nitride) layer, an Al—Cu layer of an alloy of Al (aluminum) and Cu (copper), another Ti layer and another TiN layer in this order from the side closer to the second interlayer film 27.

A wire protective film 29 of $SiO_2$ is laminated on the second interlayer film 27 and the first wiring layer 28. A second wiring layer 30 is pattern-formed on the wire protective film 29. The second wiring layer 30 has a five-layer structure obtained by laminating a Ti layer, a TiN layer, an Al—Cu layer, another Ti layer and another TiN layer in this order from the side closer to the wire protective film 29, similarly to the first wiring layer 28.

A passivation film 31 of SiN is laminated on the wire protective film 29 and the second wiring layer 30. The passivation film 31 is provided with an opening 32 for exposing a part of the second wiring layer 30 as each pad 5.

Two cavities 33 and 34 having rectangular shapes in plan view, for example, are formed in the second interlayer film 27, the wire protective film 29 and the passivation film 31, laminated with one another by partially vertically removing the laminated portions thereof.

A first piezoresistor 35 constituted of a part of the first wiring layer 28 and a first weight 36 constituted of a part of the wire protective film 29 are provided in one cavity 33. The first piezoresistor 35 extends in the axial direction X, which is parallel to the front surface of the semiconductor substrate 21, and is suspended between side surfaces of the cavity 33 opposed to each other in the direction X. The first weight 36 is supported on the first piezoresistor 35.

A second piezoresistor 37 constituted of a part of the first wiring layer 28 and a second weight 38 constituted of a part of the wire protective film 29 are provided in the other cavity 34. The second piezoresistor 37 extends in the axial direction Y parallel to the front surface of the semiconductor substrate 21 and perpendicular to the direction X and suspended between side surfaces of the cavity 34 opposed to each other in the direction Y. The second weight 38 is supported on the second piezoresistor 37.

A film layer 39 prepared from a dry film, for example, is formed on the passivation film 31. The film layer 39 closes the cavities 33 and 34. An opening 40 communicating with the opening 32 of the passivation film 31 is formed in the film layer 39. Thus, each bonding wire 6 (see FIG. 1) can be connected to the corresponding pad 5 through the opening 40 in the film layer 39 and the opening 32 in the passivation film 31.

The material for the film layer 39 is not restricted to the dry film, but the film layer 39 may alternatively be prepared from a glass material.

When acceleration in the direction X acts on the acceleration sensor 1, the second weight 38 supported on the second piezoresistor 37 extending in the direction Y oscillates in the direction X. Due to this oscillation of the second weight 38, stress resulting from torsion is applied to the second piezoresistor 37. When the stress is applied to the second piezoresistor 37, the resistivity of the second piezoresistor 37 changes in proportion to this stress, and a signal corresponding to this change of the resistivity is input in the semiconductor substrate 21. A circuit formed by the semiconductor element built in the semiconductor substrate 21 generates a signal corresponding to the amount of the change in the resistivity of the second piezoresistor 37, and this signal is output to each lead portion 7 functioning as the external connecting portion through the corresponding pad 5 and bonding wire 6. Therefore, the magnitude of the acceleration in the direction X acting on the acceleration sensor 1 can be determined on the basis of the signal output from the lead portion 7.

When acceleration in the direction Y acts on the acceleration sensor 1, on the other hand, the first weight 36 supported on the first piezoresistor 35 extending in the direction X oscillates in the direction Y. Due to this oscillation of the first weight 36, stress resulting from torsion is applied to the first piezoresistor 35. When the stress is applied to the first piezoresistor 35, the resistivity of the first piezoresistor 35 changes in proportion to this stress, and a signal corresponding to this change of the resistivity is input in the semiconductor substrate 21. The circuit formed by the semiconductor element built in the semiconductor substrate 21 generates a signal corresponding to the amount of the change in the resistivity of the first piezoresistor 35, and this signal is output to the lead portion 7 functioning as the external connecting portion through the corresponding pad 5 and bonding wire 6. Therefore, the magnitude of the acceleration in the direction Y acting on the acceleration sensor 1 can be determined on the basis of the signal output from the lead portion 7.

When acceleration in the axial direction Z perpendicular to the directions X and Y (perpendicular to the front surface of the semiconductor substrate 21) acts on the acceleration sensor 1, the first and second weights 36 and 37 respectively supported on the first and second piezoresistors 35 and 37 oscillate in the direction Z. Due to this oscillation of the first and second weights 36 and 38, stress resulting from bending is applied to the first and second piezoresistors 35 and 37. When the stress is applied to the first and second piezoresistors 35 and 37, the resistivities of the respective first and second piezoresistors 35 and 37 change in proportion to this stress, and a signal corresponding to this change of the resistivities is input in the semiconductor substrate 21. The circuit formed by the semiconductor element built in the semiconductor substrate 21 generates a signal corresponding to the amounts of the changes in the resistivity of the first and second piezoresistors 35 and 37, and this signal is output to the lead portion 7 functioning as the external connecting portion through the corresponding pad 5 and bonding wire 6. Therefore, the magnitude of the acceleration in the direction Z acting on the acceleration sensor 1 can be determined on the basis of the signal output from the lead portion 7.

FIGS. 3A to 3F are sectional views schematically showing respective steps of manufacturing the sensor chip 2.

Figure 3A:
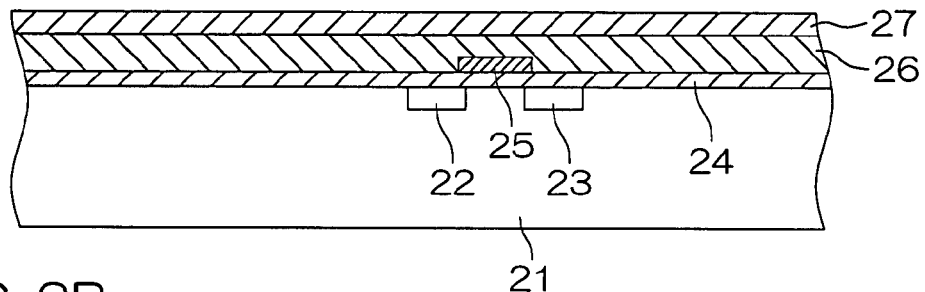
FIG. 3A is a schematic sectional view for illustrating a step of manufacturing the sensor chip.

First, the gate oxide film 24 is formed on the semiconductor substrate 21 having the semiconductor element (drain and source regions 22 and 23) built therein by thermal oxidation, as shown in FIG. 3A. Then, the gate electrode 25 is formed on the gate oxide film 24. Thereafter the first and second interlayer films 26 and 27 are successively formed by plasma CVD (chemical vapor deposition) (interlayer film forming step).

Figure 3B:
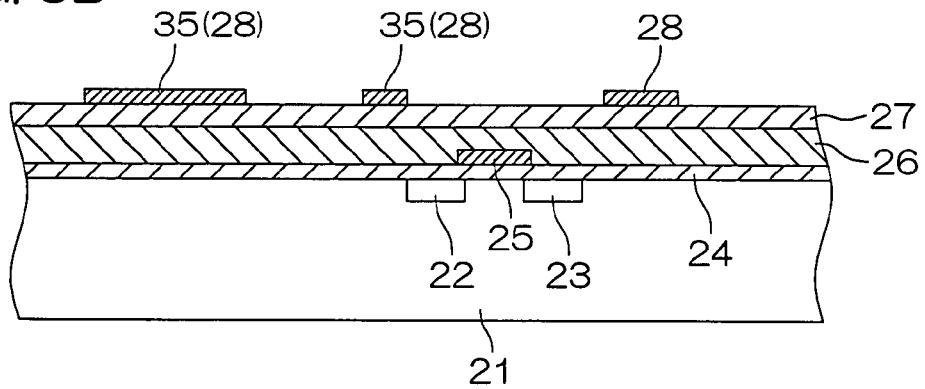
FIG. 3B is a schematic sectional view showing a step next to that shown in FIG. 3A.

Then, the first wiring layer 28 including the first and second piezoresistors 35 and 37 is formed on the second interlayer film 27 by sputtering, as shown in FIG. 3B (wiring layer forming step).

Figure 3C:
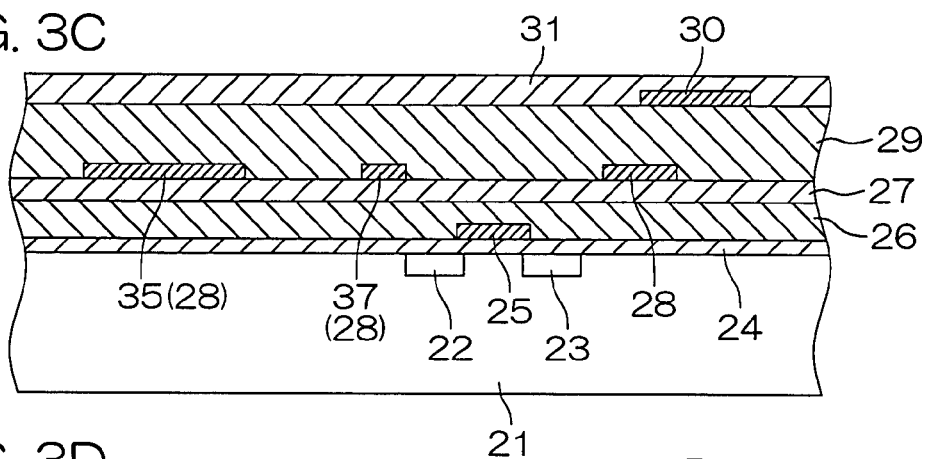
FIG. 3C is a schematic sectional view showing a step next to that shown in FIG. 3B.

Thereafter the wire protective film 29 is formed on the second interlayer film 27 and the first wiring layer 28 by plasma CVD, as shown in FIG. 3C (wire protective film forming step). Then, the second wiring layer 30 is formed by sputtering. Further, the passivation film 31 is formed on the wire protective film 29 and the second wiring layer 30 by plasma CVD.

Figure 3D:
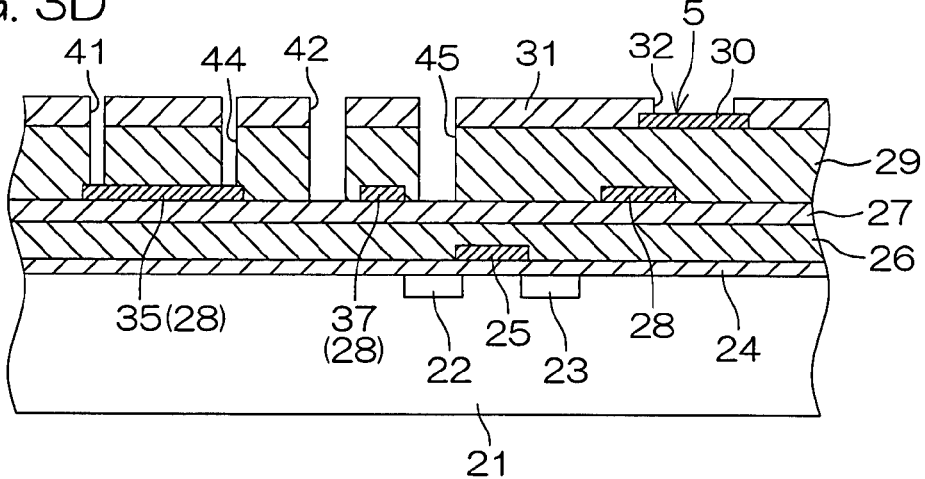
FIG. 3D is a schematic sectional view showing a step next to that shown in FIG. 3C.
Figure 3E:
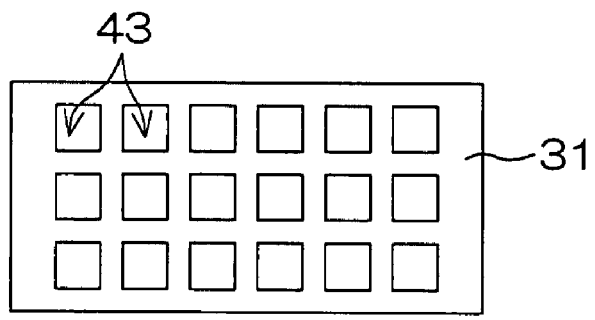
FIG. 3E is a plan view illustrating rectangular openings formed in the step shown in FIG. 3D.

Then, the passivation film 31 is selectively removed by dry etching, as shown in FIG. 3D. More specifically, the passivation film 31 is partially removed in the form of rectangular annuluses in plan view above the first and second piezoresistors 35 and 37, so that respective annular openings 41 and 42 are formed. In plan view, the outlines of the annular openings 41 and 42 respectively correspond to those of the cavities 33 and 34. Further, a large number of rectangular openings 43 are formed in each of the regions surrounded by the annular openings 41 and 42, as shown in FIG. 3E. The opening 32 exposing the pad 5 is formed by removing the part of the passivation film 31 located on the second wiring layer 30, as shown in FIG. 3D.

Thereafter annular grooves 44 and 45 respectively communicating with the annular openings 41 and 42 of the passivation film 31 are formed in the wire protective film 29 by dry etching through the passivation film 31 serving as a mask, as shown in FIG. 3D. Further, rectangular grooves (not shown) communicating with the respective rectangular openings 43 are formed (etching step).

Figure 3F:
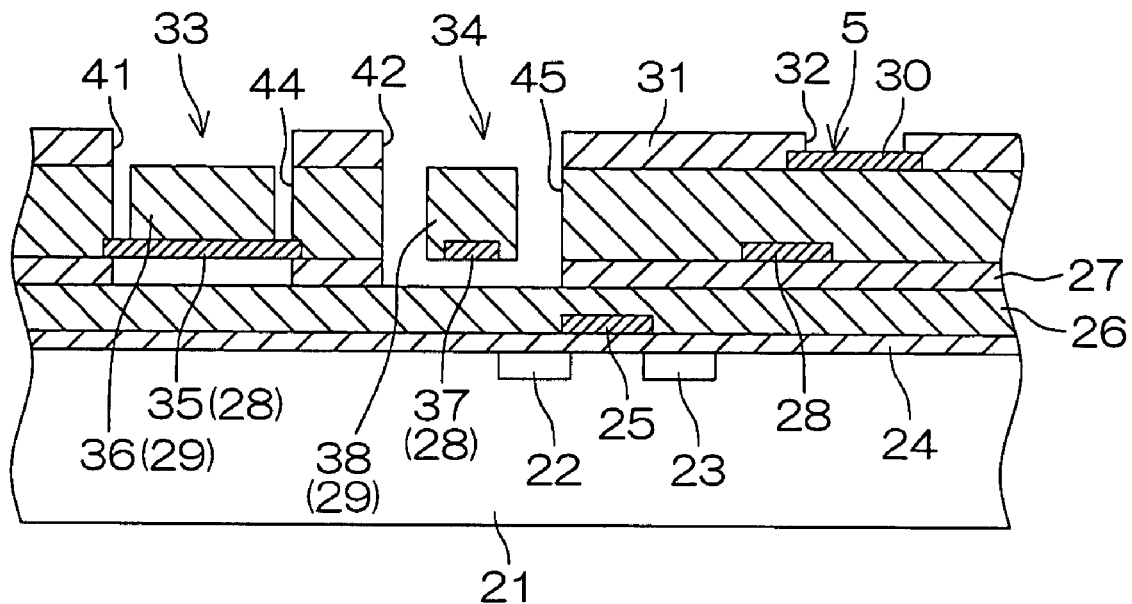
FIG. 3F is a schematic sectional view showing a step next to that shown in FIG. 3D.
Figure 4:
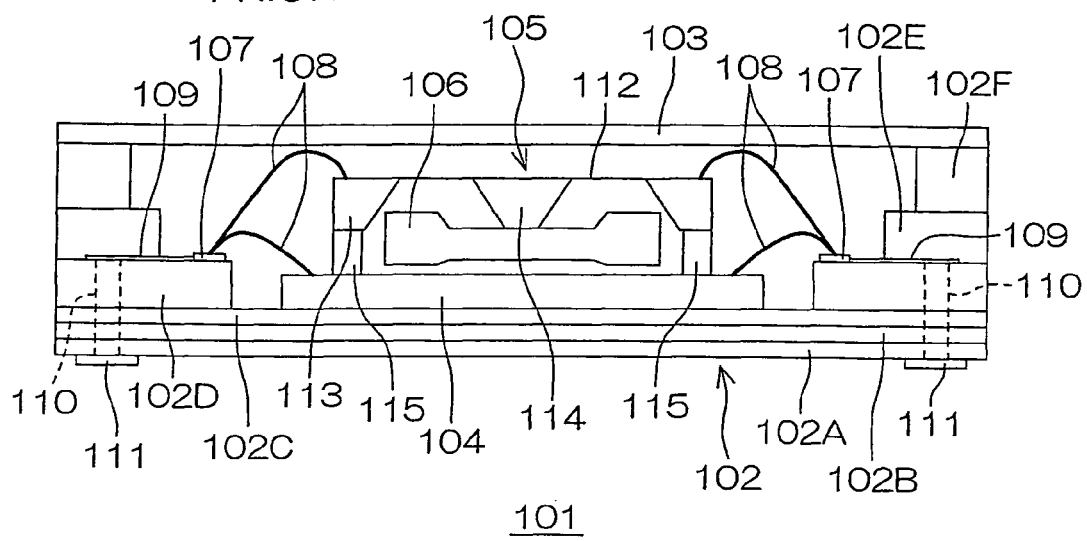
FIG. 4 is a sectional view schematically showing the structure of a conventional acceleration sensor.

Then, the parts of the passivation film 31 located on those of the wire protective film 29 surrounded by the annular grooves 44 and 45 are removed by dry etching, as shown in FIG. 3F. By this dry etching, further, the second interlayer film 27 is partially removed in the form of rectangles coinciding with the outlines of the annular openings 41 and 42 in plan view under the respective first and second piezoresistors 35 and 37. In other words, an etching gas is supplied to the second interlayer film 27 through the annular opening 41 and the annular groove 44, the annular opening 42 and the annular groove 45, and the rectangular openings 43 and the rectangular grooves (not shown). The second interlayer film 27 is rectangularly etched by the action of this etching gas and the isotropy of SiN (etching step). Consequently, the cavities 33 and 34 are formed in the laminated portions of the second interlayer film 27, the wire protective film 29 and the passivation film 31, while the first piezoresistor 35 and the first weight 36 are formed in the cavity 33, and the second piezoresistor 37 and the second weight 38 are formed in the cavity 34.

While the second interlayer film 27, the wire protective film 29 and the passivation film 31 can be worked by wet etching, any of the thin-film structures such as the first piezoresistor 35 may be broken by resistance of the etching solution when the semiconductor substrate 21 provided with the thin-film structures is pulled up from the etching solution if wet etching is employed for working the second interlayer film 27, the wire protective film 29 and the passivation film 31. When the second interlayer film 27, the wire protective film 29 and the passivation film 31 are dry etched, on the other hand, there is no possibility that any of the thin-film structures is broken.

Thereafter the film layer 39 is formed on the passivation film 31. Thus, the sensor chip 2 is obtained as shown in FIG. 2. Then, the sensor chip 2 is bonded to the lead frame 3, and the sensor chip 2 and the lead frame 3 are sealed with the resin package 8, so that the acceleration sensor 1 is obtained as shown in FIG. 1.

In the sensor chip 2, as hereinabove described, the first and second piezoresistors 35 and 37 are provided on the semiconductor substrate 21 having the semiconductor element built therein. In other words, the semiconductor element and the first and second piezoresistors 35 and 37 are integrally formed on the single sensor chip 2. When this sensor chip 2 is employed, therefore, a circuit chip provided in a conventional acceleration sensor can be omitted, and the acceleration sensor 1 can be downsized.

Further, the first and second weights 36 and 38 applying stress respectively to the first and second piezoresistors 35 and 37 are made up of parts of the wire protective film 29 for protecting the first wiring layer 28. Therefore, it is unnecessary to provide weights independently of the sensor chip 2, whereby the acceleration sensor 1 can be further downsized.

In the sensor chip 2, the first and second piezoresistors 35 and 37 respectively are extended between the side surfaces of the cavities 33 and 34, and the first and second weights 36 and 38 respectively are held on the first and second piezoresistors 35 and 37. Even when small acceleration in the direction X acts on the acceleration sensor 1, therefore, the second weight 38 reliably oscillates to change the resistivity of the second piezoresistor 37. Even when small acceleration in the direction Y acts on the acceleration sensor 1, on the other hand, the first weight 36 reliably oscillates to change the resistivity of the first piezoresistor 35. Therefore, the acceleration sensor 1 can excellently detect small amounts of acceleration in the directions X and Y.

The film layer 39 closing the cavities 33 and 34 is provided on the passivation film 31. This film layer 39 can restrict the amounts of oscillation of the first and second weights 36 and 38 in the direction Z. Therefore, the first and second weights 36 and 38 can be prevented from excessive oscillation, and the first and second piezoresistors 35 and 37 can be prevented from breaking or the like from excessive oscillation of the first and second weights 36 and 38.

While the first piezoresistor 35 linearly extends in the direction X and the second piezoresistor 37 linearly extends in the direction Y in this embodiment, the first and second piezoresistors 35 and 37 may alternatively be in the form of crosses or lattices, so that the first and second weights 36 and 38 oscillate with respect to acceleration in both of the directions X and Y acting on the acceleration sensor 1. In this case, one of the first and second piezoresistors 35 and 37 may be omitted.

Further, four cavities may be formed, in which case first piezoresistors 35 and first weights 36 are respectively provided in two of the cavities while second piezoresistors 37 and second weights 38 are respectively provided in the remaining two cavities. In this case, acceleration in the directions Y and Z can be precisely detected on the basis of the difference between the amounts of changes in the resistivity of the two first piezoresistors 35. Further, acceleration in the directions X and Z can be precisely detected on the basis of the difference between the amounts of changes in the resistivity of the two second piezoresistors 37.

Although the present invention has been described and illustrated in detail, it is understood that the same is by way of illustration and example only for explaining the technical contents of the present invention and is not to be taken by way of limitation, the spirit and scope of the present invention being limited only by the terms of the appended Claims.

This application corresponds to Japanese Patent Application No. 2006-224433 filed on Aug. 21, 2006, the disclosure of which is hereby incorporated into the present application.

What is claimed is:

1. An acceleration sensor comprising:
    a semiconductor element built in a substrate;
    a wiring layer formed on the substrate;
    a piezoresistor, formed on the substrate and made up of a part of the wiring layer, whose resistivity changes by the action of acceleration;
    a wire protective film formed on the wiring layer for protecting the wiring layer;
        a weight made up of a part of the wire protective film located on the piezoresistor for applying stress to the piezoresistor by action of acceleration; and
    an interlayer film adjacently formed under the wiring layer, wherein
    the piezoresistor and the weight are arranged in a cavity formed by etching the wire protective film and the interlayer film, and
    the piezoresistor is extended between side surfaces of the cavity.

2. The acceleration sensor according to claim 1, further comprising a film layer formed on the wire protective film for closing the cavity.

3. A method of manufacturing an acceleration sensor comprising:
    an interlayer film forming step of forming an interlayer film on a substrate having a semiconductor element built therein;
    a wiring layer forming step of forming a wiring layer on the interlayer film;
    a wire protective film forming step of forming a wire protective film on the wiring layer for protecting the wiring layer; and
    an etching step of etching the wire protective film and the interlayer film to thereby form a piezoresistor made up of a part of the wiring layer and a weight made up of a part of the wire protective film located on the piezoresistor.

* * * * *